United States Patent [19]

Reichental et al.

[11] Patent Number: 5,776,510
[45] Date of Patent: Jul. 7, 1998

[54] ON-DEMAND PRODUCTION OF FOAM CUSHIONS WITH DEFINED THREE-DIMENSIONAL GEOMETRY

[75] Inventors: Abraham N. Reichental, Southbury; Alexander Shafir, Watertown; George T. Bertram, Newtown, all of Conn.; James M. Corliss, Spofford, N.H.

[73] Assignee: Sealed Air Corporation, Saddle Brook, N.J.

[21] Appl. No.: 743,401

[22] Filed: Nov. 1, 1996

[51] Int. Cl.$^6$ .............................. B29C 44/36; B65B 9/02
[52] U.S. Cl. .............................. 425/112; 53/570; 53/574; 156/539; 425/4 R; 425/137; 425/145; 425/388; 425/437
[58] Field of Search ...................... 425/4 R, 4 C, 425/137, 145, 388, 437, 112; 53/558, 562, 570, 574; 156/539

[56] References Cited

U.S. PATENT DOCUMENTS

| | | |
|---|---|---|
| 3,221,474 | 12/1965 | Hoffmann et al. ............ 53/558 |
| 3,268,636 | 8/1966 | Angell, Jr. . |
| 3,330,407 | 7/1967 | Graves et al. . |
| 3,566,449 | 3/1971 | Goins et al. . |
| 4,053,549 | 10/1977 | Vandor . |
| 4,208,368 | 6/1980 | Egli . |
| 4,240,557 | 12/1980 | Dickens . |
| 4,285,893 | 8/1981 | Contastin . |
| 4,479,914 | 10/1984 | Baumrucker . |
| 4,674,268 | 6/1987 | Gavronsky et al. . |
| 4,737,329 | 4/1988 | Rakoczy . |
| 4,740,258 | 4/1988 | Breitscheidel . |
| 4,783,292 | 11/1988 | Rogers . |
| 4,801,260 | 1/1989 | Oles et al. ............... 425/527 |
| 4,874,649 | 10/1989 | Daubenbuchel et al. ........ 428/36.5 |
| 4,923,746 | 5/1990 | Balmisse et al. . |
| 4,927,044 | 5/1990 | Gotoh et al. . |
| 4,927,575 | 5/1990 | Brock et al. . |
| 4,999,975 | 3/1991 | Willden et al. ............ 53/472 |
| 5,027,583 | 7/1991 | Chelak . |
| 5,098,621 | 3/1992 | Hermann . |
| 5,335,483 | 8/1994 | Gavronsky et al. . |
| 5,366,674 | 11/1994 | Hattori et al. ............ 264/46.6 |
| 5,368,458 | 11/1994 | Addeo et al. ............ 425/4 R |
| 5,376,219 | 12/1994 | Sperry et al. . |
| 5,555,709 | 9/1996 | Savigny et al. ............ 53/570 |

Primary Examiner—Allan R. Kuhns
Attorney, Agent, or Firm—Bell Seltzer Intellectual Property Group of Alston & Bird LLP

[57] ABSTRACT

An apparatus is disclosed for automatically molding defined three-dimensional foam cushions. The apparatus comprises means for preparing a bag from plastic film material and for enclosing a foamable composition in the plastic bag, means for concurrently aligning a mold with the plastic bag and the bag preparing means, means for placing the bag containing the foamable composition into the aligned mold as the foamable composition begins to form foam, and means for maintaining the bag in the mold until the foamable composition has substantially finished forming foam in a shape conforming to the mold.

26 Claims, 8 Drawing Sheets

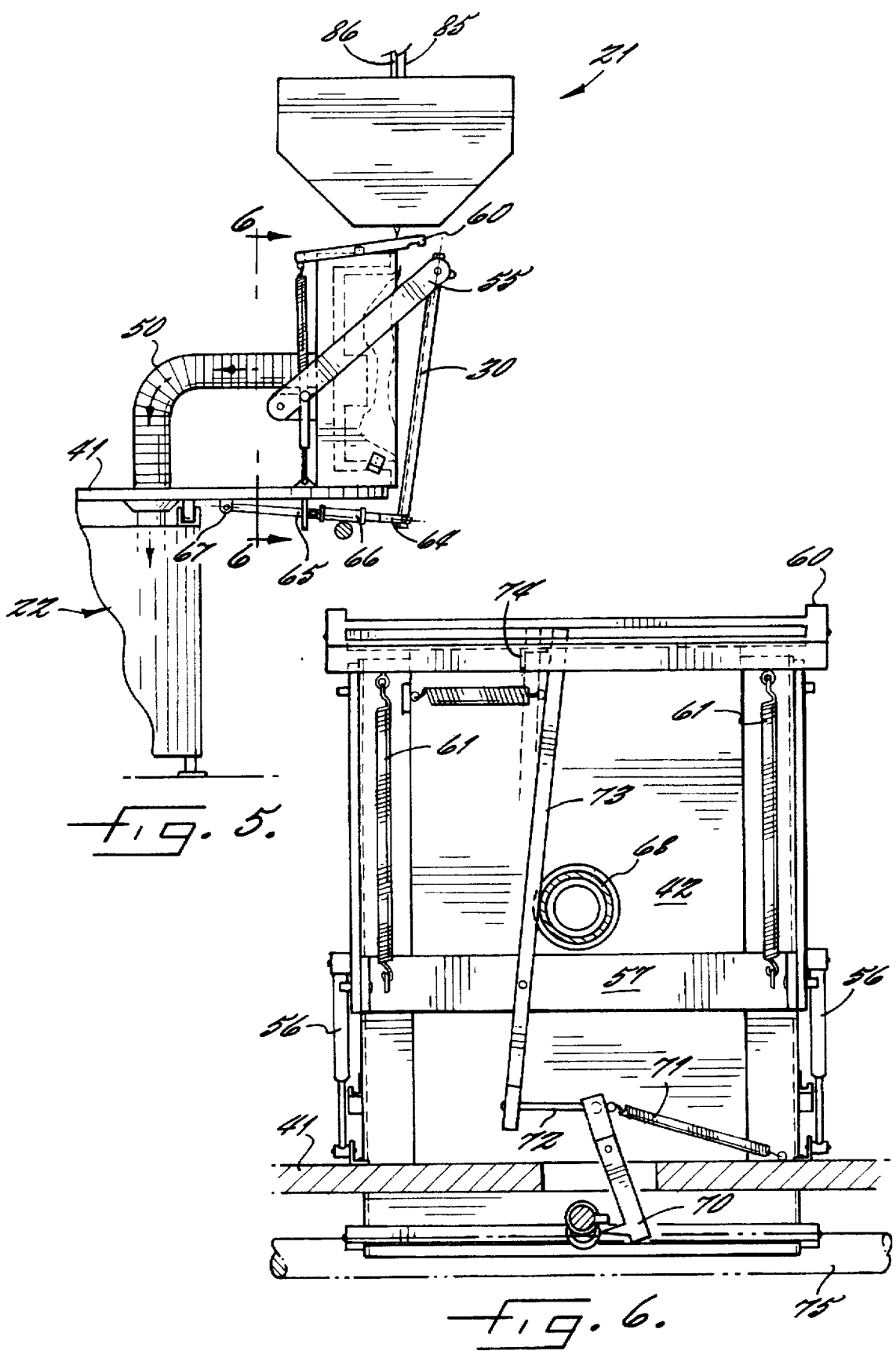

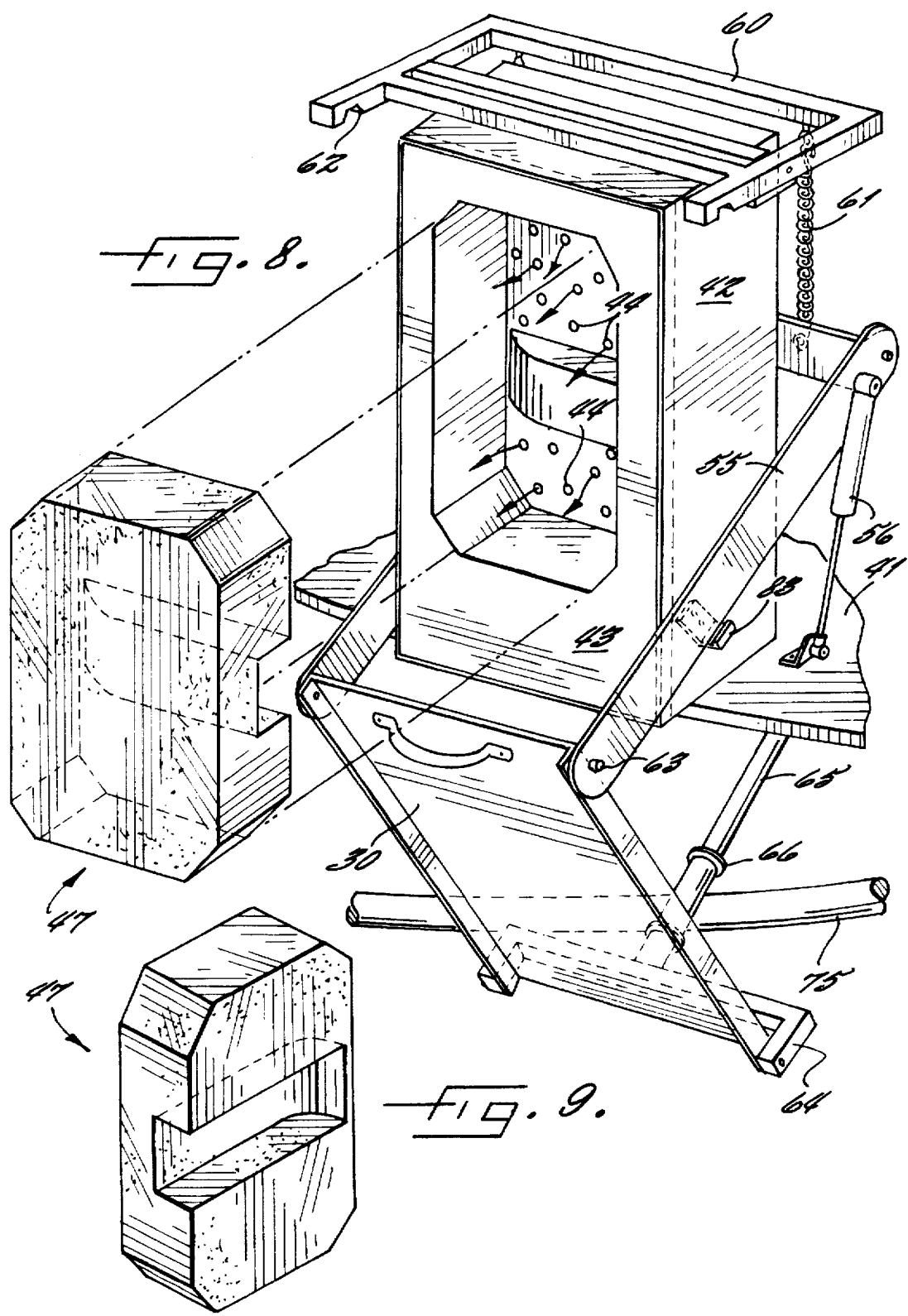

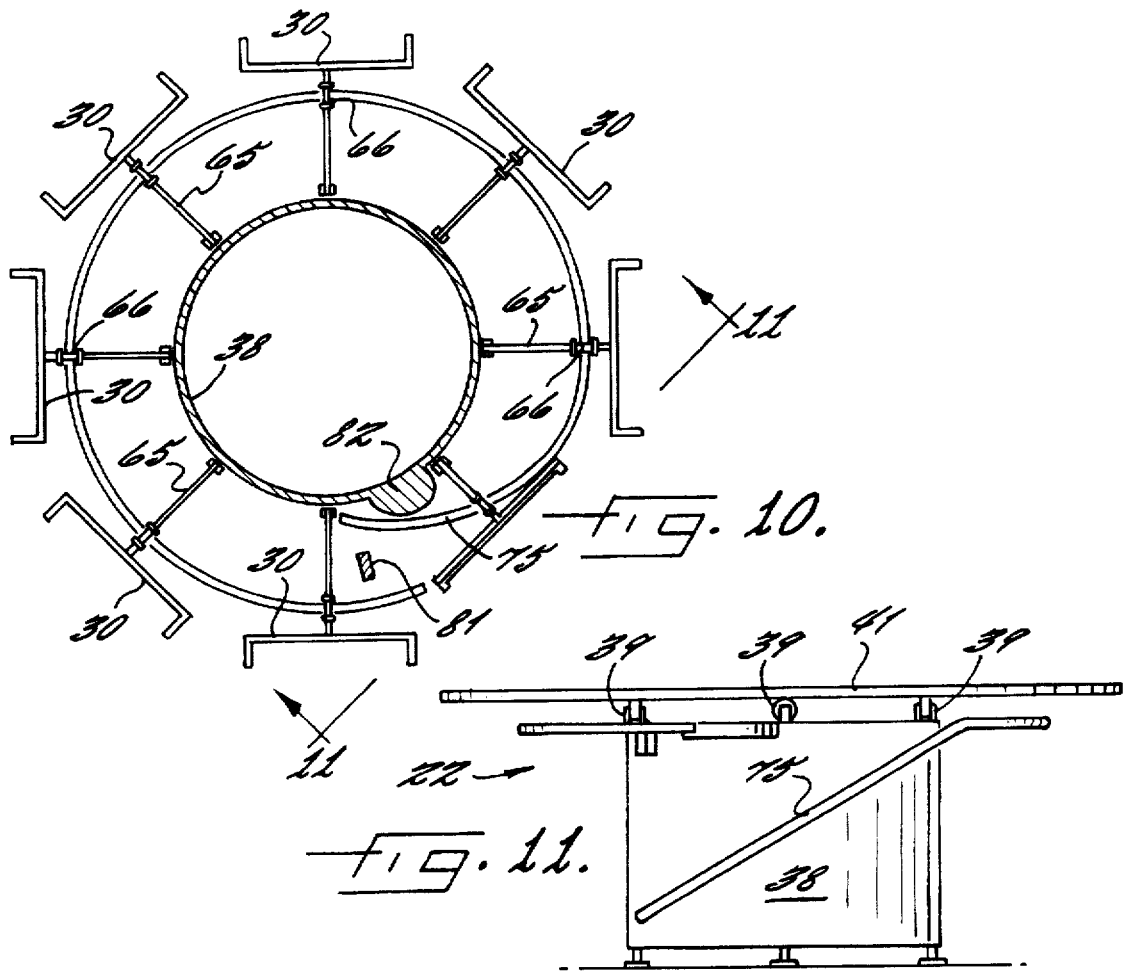
Fig. 10.
Fig. 11.
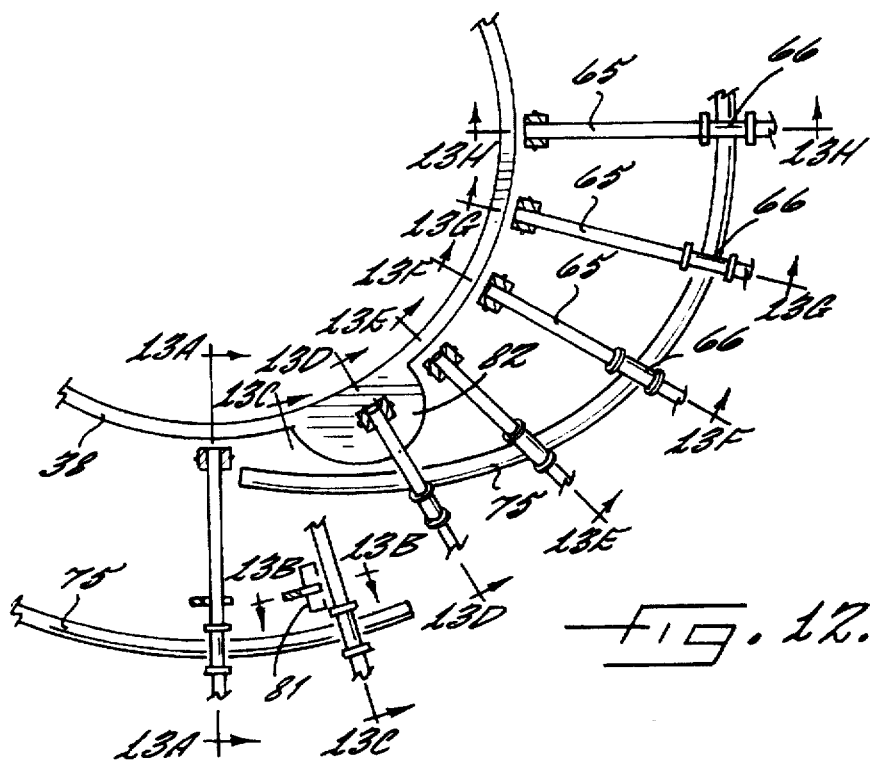
Fig. 12.

1

ON-DEMAND PRODUCTION OF FOAM CUSHIONS WITH DEFINED THREE-DIMENSIONAL GEOMETRY

FIELD OF THE INVENTION

The present invention relates to protective packaging techniques, and more particularly relates to an apparatus and method for forming, on an on-demand basis, foam cushions with defined three-dimensional geometries for packaging objects within containers.

BACKGROUND OF THE INVENTION

The present invention is related to foam-in-place packaging, and offers an alternative to high inventory packaging materials such as corrugated board forms and premolded polymer (e.g. polystyrene foam) packaging forms.

Foam-in-place packaging is a highly useful technique for on-demand protection of packaged objects. In its most basic form, foam-in-place packaging comprises injecting foamable compositions from a dispenser into a container that holds an object to be cushioned. Typically the object is wrapped in plastic to keep it from direct contact with the rising (expanding) foam. As the foam rises, it expands into the remaining space between the object and its container (e.g. a corrugated board box) thus forming a custom cushion for the object.

A common foaming composition is formed by mixing a diisocyanate with propylene glycol in the presence of some water and a catalyst. These precursors react to form polyurethane while at the same time generating carbon dioxide gas. As the gas escapes, it forms the foam cell structure that protects the packaged object.

In other types of foam-in-place packaging, the foam precursors are injected into a plastic bag which is then dropped into a container holding the object to be cushioned. The rising foam again tends to expand into the available space, but does so inside the bag. Because the bags are formed of flexible plastic, they form individual custom foam cushions for the packaged objects. In several techniques, a specific apparatus is used to make the bag from plastic film while concurrently injecting it with foam. Exemplary devices are assigned to the assignee of the present invention, and are illustrated, for example, in U.S. Pat. Nos. 5,027,583 and 5,376,219, and in pending application Ser. No. 08/514,010 filed Aug. 11, 1995 for "Compact Packaging Device for Forming Foam Filled Cushions and Related Method," the contents of each of which are incorporated entirely herein by reference.

Such foam-in-place packaging has gained wide acceptance in many industries. The nature of the technique and the cushions, however, are such that each individual cushion forms a shape that is dictated by a number of variables including the size and shape of the object being packaged, the size and shape of the container, the position of the object in the container, and the placement of the bag in the container before the foam finishes rising. As a result—and indeed as an advantage in many circumstances—each foam cushion tends to be a unique customized shape different from almost all other similar cushions. Any cushions that turn out similar or identical do so only by random chance. Accordingly, such random foam-in-place packaging cushions are highly sought after in packaging situations where different objects of different sizes and different shapes must be placed in different boxes on a regular basis. In such circumstances, cushions limited to specific shapes and sizes would represent a disadvantage rather than an advantage.

There are, however, other packaging applications in which similar or identical objects are repeatedly placed in similar or identical orientations in similar or identically sized containers. Such circumstances greatly decrease the need for continuously varying custom cushion sizes, and instead increase the need for more standard packaging elements that have a consistent size and shape.

To date, such standard packaging has been provided by several types of materials. Premolded polystyrene foam is one such common example, as are precut corrugated board (sometimes referred to colloquially as "cardboard"), pressed paper, and other similar materials.

Although such materials are quite useful, their precut (e.g. corrugated board) or premolded (e.g. polystyrene foam) nature requires maintaining an inventory of such materials that corresponds to the inventory of items to be packaged. Accordingly, in situations where a large number of objects must be packaged and shipped, a correspondingly large inventory of the packaging cushion materials must be kept in the immediate vicinity. Because the nature of most cushioning materials is such that they have a high ratio of volume to weight, they tend to take up a relatively large amount of space. Accordingly, such space must be provided and maintained in the immediate vicinity of the objects to be packaged. In a business environment, such inventory space represents a cost. Accordingly, a significant space savings represents a significant cost savings.

Additionally conventional methods of manufacturing foam packaging with defined three-dimensional geometries suffer from other disadvantages. These include: irregular cooling when molten foam is directed into molds; the desire or necessity for the skin of the cushion to differ from its interior structure (i.e. a closed skin combined with a cellular interior); the need to control the speed with which a mold is filled; the complexity of combining blowing gases (e.g. carbon dioxide or foam) with melted polymer liquids; and the similar complexity of gas counter-pressure techniques.

Corrugated board has its own disadvantages, including its strength being limited to one direction, which in turn requires that three-dimensional cushions be formed from relatively complex combinations of folded or cut pieces. Additionally, moisture greatly weakens most corrugated board, rendering it unacceptable in certain packaging circumstances.

Pressed paper can form a useful cushion if used in sufficient amounts—which is a disadvantage to begin with—but offers almost no structural strength, and thus is almost completely unsuitable where physical support of an object is required for proper packaging.

OBJECT AND SUMMARY OF THE INVENTION

Therefore, it is an object of the present invention to provide a method for producing foam cushions with defined three-dimensional geometries, for doing so on-demand to thus effectively eliminate inventory requirements, and for minimizing or eliminating the other problems associated with conventional defined-cushion packaging methods.

The invention meets this object with an apparatus and method for automatically molding defined three-dimensional foam cushions. The apparatus comprises means for preparing a bag from plastic film material and for enclosing a foamable composition in the plastic bag; means for concurrently aligning a mold with the plastic bag and the bag preparing means; means for placing the bag containing the foamable composition in the aligned mold as the foamable composition begins to form foam; and means for maintaining the bag in the mold until the foamable composition has substantially finished forming foam in a shape conforming to the mold.

In another aspect, the invention comprises a method of automatically molding defined three-dimensional foam cushions comprising the steps of preparing a plastic bag from a stock supply of plastic film material; placing and sealing a foamable composition in the prepared plastic bag; aligning the prepared bag with a three-dimensional mold prior to separating the bag from the stock supply; separating the aligned bag from the stock supply of plastic film material; delivering the bag and the enclosing foamable composition to a three-dimensional mold; and maintaining the bag in the mold until the foamable composition has substantially finished forming foam.

The foregoing and other objects, advantages and features of the invention, and the manner in which the same are accomplished, will be more readily apparent upon consideration of the following detailed description of the invention taken in conjunction with the accompanying drawings, which illustrate preferred and exemplary embodiments, and wherein:

BRIEF DESCRIPTION OF THE DRAWINGS

FIG. 5 is a side elevational view of one mold according to the present invention;

FIG. 6 is an elevational view taken along lines 6—6 of FIG. 5;

FIG. 8 is a perspective and partially exploded view of a mold and a foam cushion complementing the mold according to the present invention;

FIG. 9 is a perspective view of a foam cushion formed according to the present invention;

FIG. 10 is a top plan view of the apparatus according to the present invention taken from just underneath the turntable;

FIG. 11 is a side elevational view taken along lines 11—11 of FIG. 10;

FIG. 12 is a partial and enlarged top plan view taken from the same point as FIG. 10.

DETAILED DESCRIPTION OF THE PREFERRED EMBODIMENT

Figure 1:
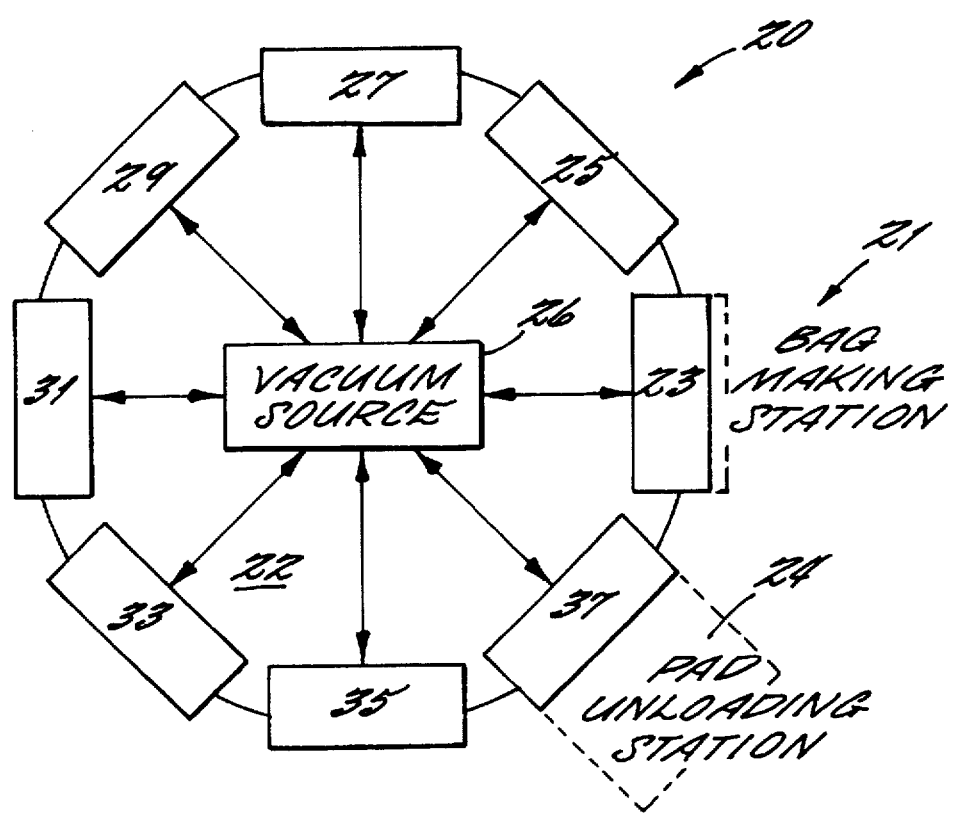
FIG. 1 is a schematic view of an apparatus according to the present invention.

The present invention is an apparatus for automatically molding three-dimensional foam cushions with defined three-dimensional geometry. FIG. 1 is a schematic view of the apparatus broadly designated at 20. The apparatus 20 comprises means schematically designated as the bag making station 21 for preparing a bag from plastic film material and for enclosing a foamable composition in the plastic bag. It will be understood that as used herein, the term "bag" is used in a broad sense, to designate a sealed container made from flexible sheet material, and could include structures that are also referred to as "envelopes", "pouches", or other related terms, without departing from the scope of the claims. The term "bag" is nevertheless accurate and convenient and will be used throughout this specification.

The bag making station 21 (which will be described in more detail with respect to FIG. 4), can comprise any of several devices that form bags while concurrently filling them with a foamable composition. Several such devices have been set forth in the background portion of the specification and their representative patents incorporated entirely herein. Exemplary devices are also available from the assignee of this invention, Sealed Air Corporation of Saddle Brook, N.J. under the trademarks INSTAPACKER™, VERSAPACKER™, and SPEEDYPACKER™, among others. The operation and structure of these devices has been well described in the aforementioned incorporated patents and will not be repeated herein except where otherwise necessary to illustrate particular aspects of the present invention.

The invention further comprises means illustrated in the preferred embodiment as the turntable 22 (driven by an appropriate means and typically by an electric motor) for concurrently aligning one of the molds 23, 25, 27, 29, 31, 33, 35, and 37 with a plastic bag and the bag preparing means 21. Although all of the molds are identical, they have been numbered differently herein in order to highlight some of the sequential steps of operation of the invention. In FIG. 1, the mold designated 23 is illustrated as aligned with the bag making station ("bag preparing means") 21.

FIG. 1 also illustrates a pad unloading station 24. It will be understood that the pad unloading station 24 is a position rather than a physical element, and in FIG. 1 the mold designated 37 is illustrated at the pad unloading station 24. FIG. 1 also illustrates the vacuum source 26 which forms a portion of the means for concurrently aligning a mold with the plastic bag and the bag preparing means. The vacuum source also forms the means for placing the bag containing the foamable composition into the aligned mold as the foamable composition begins to form foam. The illustrated embodiment includes a single vacuum source 26 which, as will be described further herein, applies the vacuum only to the mold 23 at the bag making station 21. It will be understood, however, that the invention is not limited to a central vacuum source, but that individual vacuum sources could be associated with each of the molds as well. Other than its use in the present invention, the vacuum source can be entirely conventional motor and fan arrangement, and will not be discussed in detail herein.

Figure 4:
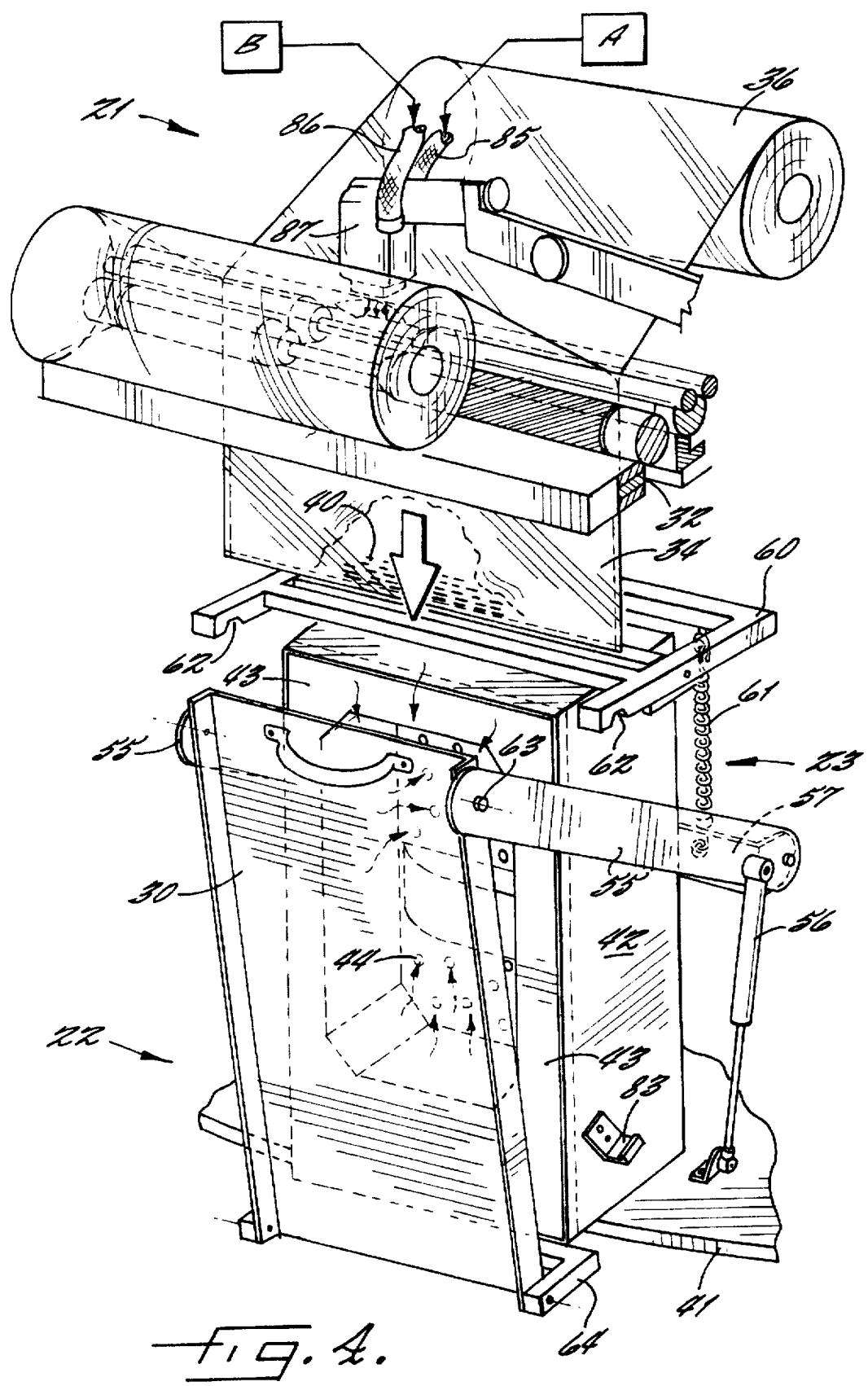
FIG. 4 is a perspective view of the bag making apparatus and a mold according to the present invention.

FIG. 4 illustrates a number of features of the invention including the means shown as the door 30 for maintaining a bag in the mold 23 until the foamable composition has substantially finished forming foam in a shape conforming to the mold.

FIG. 4 also illustrates that the bag making station broadly designated at 21 is of the type that prepares the plastic bag from two separate sheets of plastic film material and seals two longitudinal edges and two transverse edges to form the bag. As noted above, the salient features of such an apparatus are described in more detail in incorporated U.S. Pat. No. 5,376,219. It will also be recognized that depending upon the circumstances, the plastic bag can be prepared from a center-folded sheet of plastic film material by sealing one longitudinal edge and two transverse edges to form the bag (with the center fold forming the fourth edge; e.g. copending application Ser. No. 08/514,010), or by preparing the bag from a tube of plastic film material and thereafter sealing two transverse edges to form the bag.

FIG. 4 shows that the apparatus 21 comprises means shown as the heat seal strip 32 for separating a plastic bag 34 from the plastic film material 36 after the foamable composition has been placed therein. The heat seal strip 32 both heat seals the trailing edge of the bag 34 being made and at the same time severs the bag 34 from the remaining plastic film material 36 in a manner clearly described in U.S. Pat. No. 5,376,219, which also describes how the longitudinal side seals are formed.

Figure 2:
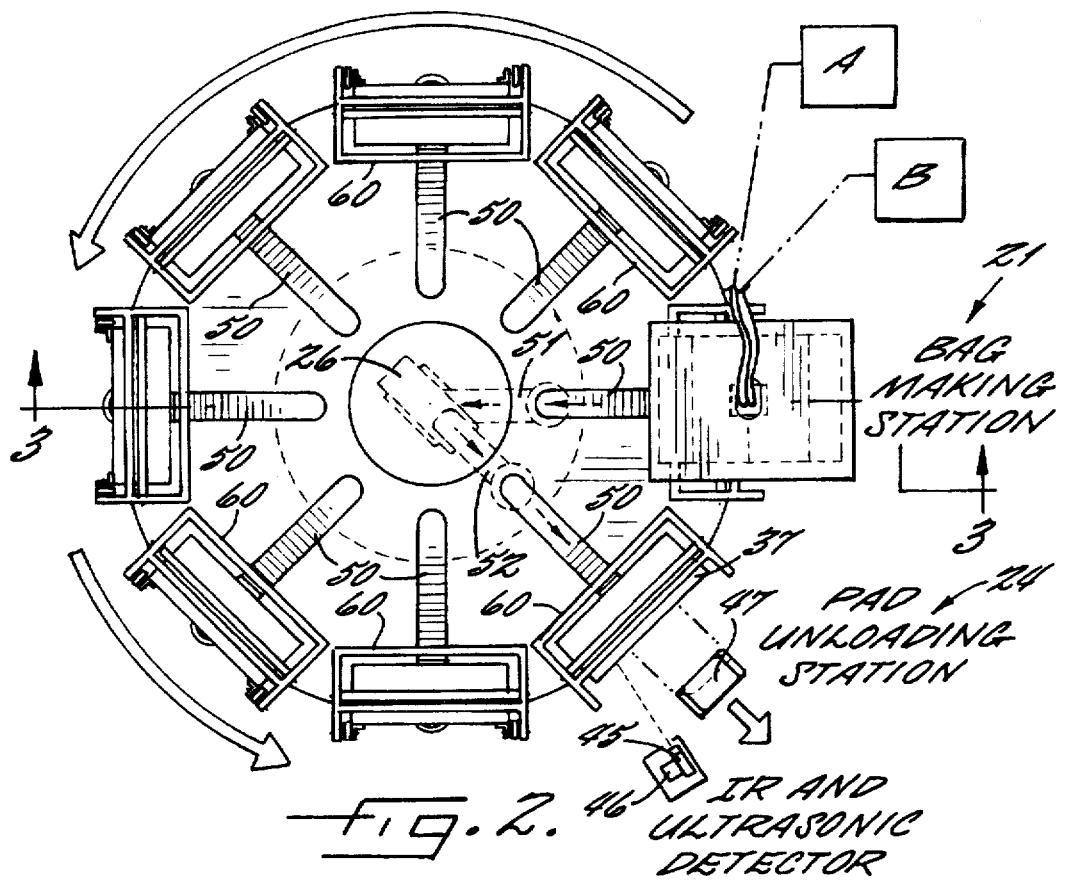
FIG. 2 is a top plan view of an apparatus according to the present invention.
Figure 3:
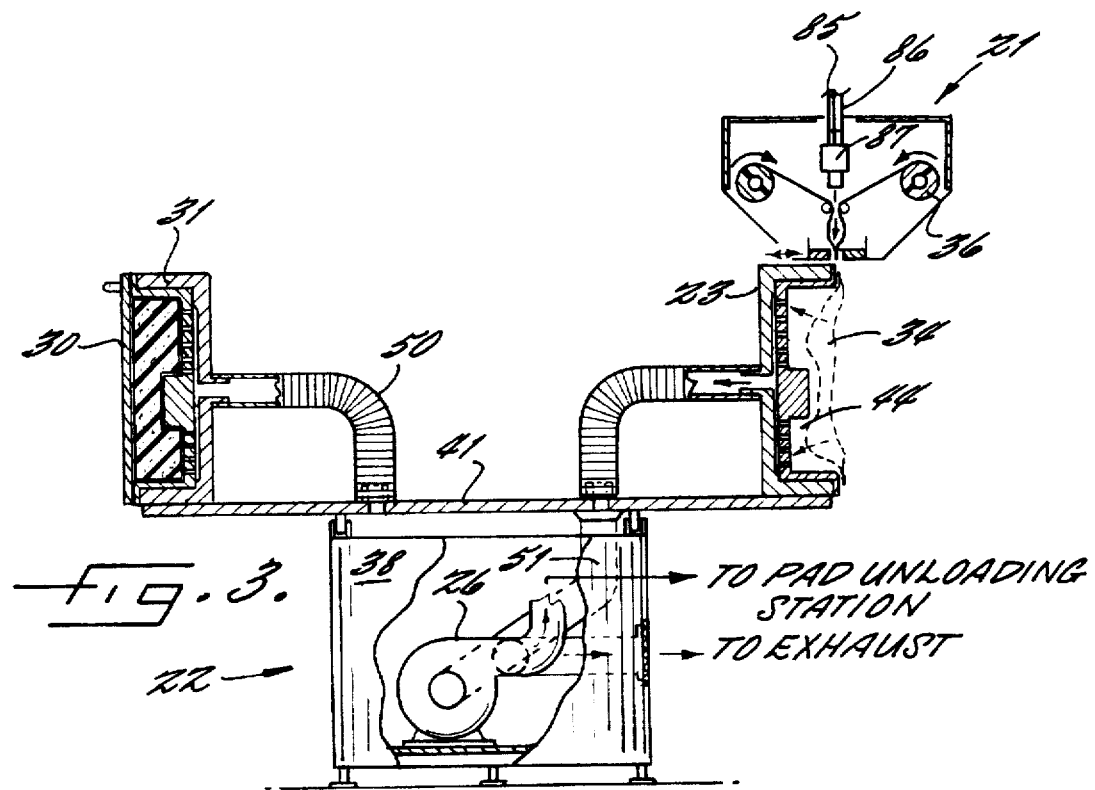
FIG. 3 is a cross-sectional view taken along lines 3—3 of FIG. 2.

FIG. 4 also illustrates that the turntable broadly designated at 22 and its top surface portion 41 form a portion of the aligning means that align the bag 34 with the mold 23 before the bag is separated from the plastic film material. FIGS. 2, 3, and 11 also illustrate the turret 38 that supports the top surface 41. FIGS. 3 and 11 further illustrate that the top surface 41 rides the turret 38 on a plurality (typically four or six) of wheels 39. In the illustrated embodiment, the wheels 39 are fixed to the turret 38.

As noted earlier with respect to FIG. 1, the means for placing the bag containing the foamable composition into the mold comprises means for applying a vacuum through the mold and to a bag to help position a bag into a mold as the foamable composition begins to form foam. In this regard, the mold designated at 23 in FIGS. 1 and 4 comprises an assembly of several parts that accomplish the intended purpose. In particular, the mold assembly 23 includes a rectangular mold support 42 which is generally made of metal and is fixed to the top surface 41 of the turntable 22. The mold support 42 holds the mold insert 43 which is typically formed of wood. Wood is of generally light weight, inexpensive, and easy to work into the required shapes. It will, of course, be understood that a number of other materials are similarly suitable for the mold support 42 and insert 43.

The mold insert 43 carries a plurality of holes 44 that permit a vacuum to be respectively applied therethrough. As FIG. 4 illustrates, the holes are generally small compared to the size of the mold, and thus do not distort the overall shape of the cushion made by the mold, but the applied vacuum pulls the plastic film material into the mold and against the mold walls to help provide good mold definition as well as help hold the bag 34 in alignment with the mold 23 during the desired portion of the operating cycle. In this regard, FIG. 2 shows that the vacuum source 26 which is generally positioned under the top surface 41 of the turntable 22, pulls suction on the mold 23 at the bag making station 21, and on its exhaust side, pushes air towards the mold 37 at pad unloading station 24. Thus, the plurality of holes 44 in the mold insert 43 permit blowing air to be applied through the mold 23 to provide the mold with means for releasing a finished cushion in addition to providing access for the vacuum.

FIGS. 2 and 10 also illustrate that in preferred embodiments the apparatus 20 comprises a plurality of molds and the turntable 22 sequentially presents the molds to and aligns the molds with, the bag making station 21 so that the molds sequentially receive plastic bags containing the foamable composition.

FIG. 2 also illustrates that the apparatus 20 further comprises means, illustrated as the infrared detector 45, for measuring the temperature of the mold insert 44 just prior to placing a bag therein. The invention further comprises means for adjusting the amount of foamable composition placed in a bag based upon the measured temperature.

As known to those familiar with foamable compositions, and indeed to the general behavior of gases, the volume occupied by a gas is directly proportional to its temperature. Because the foam is formed by the combination of a polymer and a generating gas, the temperature of the foam, or of its surrounding, will have a directly proportional affect on the volume of gas, and thus the volume of foam, formed from any particular amount of precursor compositions. Stated more directly, when the mold (or the ambient temperature) is warmer, the foam tends to expand to a greater degree than when the mold is cooler. Thus, the apparatus 20 adjusts the amount of foamable composition whenever the temperature of the mold changes. Typically, the molds tend to get warmer during operation. Thus, adjusting the foamable composition based on mold temperature serves several advantageous purposes: it helps produce cushions with a consistent size; it prevents expanding foam from rupturing the bag; it compensates for the extra gas that seems to be generated in a hot mold; and it avoids wasting excess foamable composition, thus providing an economic advantage. The characteristics of polyurethane foam are such that the temperature-based differences in the amounts of foam used to make a given sized cushion do not affect its cushioning properties to any noticeable extent.

The control device that uses the measured temperature to adjust the amount of foam being injected into a bag is of the type generally referred to as a feedback circuit, many examples of which are well known in the art, and an appropriate one can be selected without undue experimentation. The preferred embodiments use a personal computer in conjunction with the various feedback controls to carry out this adjustment. Such controls and their operation are well known in the art and an exemplary discussion is set forth in Dorf, *The Electrical Engineering Handbook*, Chapter 93, pages 2099–2153, "Control Systems" (1993) by CRC Press, Inc.

FIG. 2 also illustrates that the apparatus 20 further comprises means shown as the ultrasonic detector 46 for preventing a second bag for being placed in a mold that already carries a bag or finished cushion. For several reasons, including a common line of sight to the mold insert 43, the detector 46 is most conveniently placed adjacent to the infrared detector 45. If the ultrasonic detector 46 senses the presence of a finished cushion 47 in the mold insert 43 in the mold 37 at the pad unloading station 24, the detector 46 signals the bag making station 21 to refrain from making and placing a bag in mold 37 until the finished cushion 47 has been removed.

FIGS. 2 and 3 illustrate some additional features of the invention. In particular, FIGS. 2 and 3 illustrate that the vacuum source 26 applies the vacuum (or the blowing air) through the respective hoses 50. The hoses 50 are fixed in position to the top surface 41 of the turntable 22 and a vacuum is applied when the hose 50 of the mold (23 in the illustrations) to which it is connected reaches the bag making station 21. In that position, the hose aligns with the fixed pipe 51 of the vacuum source 26 to pull the vacuum on the mold 23 and more particularly through the mold insert 43 and against the bag 34 being positioned therein (FIG. 3). The top surface 41 of the turntable 22 has a respective opening therethrough corresponding to each vacuum hose 50 to complete the air flow path between the mold and the vacuum source.

The same situation takes place in reverse when the mold (37 in the drawings) reaches the pad unloading station 24. In that position, its respective hose 50 is aligned with the blower pipe 52 of the vacuum means 26. In this manner, the turntable provides the means for providing a vacuum through the holes 44 and for blowing release air through the holes 44. In such position, the outwardly flowing air helps release the cushion 47 from the mold insert 43.

In order to produce pads of a defined shape, the apparatus includes not only the molds 43, but respective doors 30 which, when closed, limit the expansion of the foamable precursors in the bag 34 to the shape defined by the mold insert 43 and the closed door 30. Thus, the doors 30 provide the means for maintaining the bag 34 in the mold insert 43. In operation the door 30 opens to receive a bag 34, closes to maintain the bag 34 in the mold insert 43, and reopens to permit the bag 34 to be removed from the mold insert 43.

The door 30 opens and closes in conjunction with the movement of the turntable 22 and its top surface 41 on the turret 38. The turntable 22 provides the means for opening the door 30 to permit the bag to be positioned in the mold insert 43, means for closing the door 30 to maintain a bag 34 in the mold 43 while the foamable composition forms foam into a molded bag, and provides the means for reopening the door 30 to remove a molded foam cushion 47 from the mold insert 43 after the foamable composition has substantially finished forming foam.

FIGS. 4 through 13 illustrate the movement of the door 30 in some detail. In an overall fashion, however, the sequence is as follows. The door 30 opens as the mold 23 reaches the pad unloading station. The door remains open as the mold rotates underneath the bag making device 21. When a bag has been placed in the mold at the bag making station 21, the door 20 is closed and remains closed as the mold 23 progresses from position to position along the circumferential path of the turntable. When the mold again reaches the pad unloading station 24, the door 30 opens to permit the finished cushion inside to be removed.

In the illustrated embodiment, the door 30 is opened and closed by being raised and lowered. It will be understood, however, that the manner in which the doors 30 are mechanically or otherwise opened and closed does not represent a limitation of the invention or of the scope of the claims.

In the illustrated embodiment, the door mechanism includes the side arms 55 which are pivotally connected to the doors 30 on each side. The door side arms 55 are also connected to a respective pair of gas springs 56 and a rear crossbar 57. When closed, the door 30 is held in place by a pivoting top clamp 60. The top clamp 60 and the rear crossbar 57 are connected by a pair of vertically oriented coil springs 61. As perhaps best illustrated by FIGS. 4, 5, and 6, the springs 61 urge the top clamp 60 to pivot downwardly in the rear and upwardly in the front to unlatch the door 30. The top clamp 60 includes the seat portions 62 that engage the pins 63 which also serve as the pivot attachments of the side arms 55 to the door 30.

The door assembly also includes a pivoting bracket 64 at its lowest portions. FIG. 5 illustrates that the pivoting bracket 64 attaches to a door lift arm 65 with a rolling collar 66. The door lift arm 65 is also pivotally attached to the bottom of the turntable surface 41 by a pivot bracket 67.

In addition to those features already described, FIG. 6 illustrates another portion of the door latching mechanism. This includes the bottom latch 70 which pivots and is biased by a spring 71 against its connection with the pin 72 to the rear locking bar 73. In turn the rear locking bar 73 pivots upon the rear crossbar 57. When the rear locking bar 73 pivots in a counterclockwise direction, it engages the locking elbow 74 on the upper portions of the molded support 42. In this position the locking bar 73 keeps the top clamp 60 pivoted against the door 30 to help keep it closed. Alternatively, when the rear locking bar 73 is pivoted in a clockwise direction, it releases the top clamp 60. The springs 61 urge the top clamp 60 to pivot rearwardly, thus unclamping the door 30. As FIG. 6 illustrates, the rear locking bar 73 pivots clockwise when the bottom latch 70 pivots counterclockwise, through the action of the pivots and the pin 72.

FIG. 6 illustrates the rear of the mold support with the vacuum hose 50 removed, and thus shows the hose opening 68 in the rear wall of the mold support 42.

Figure 7:
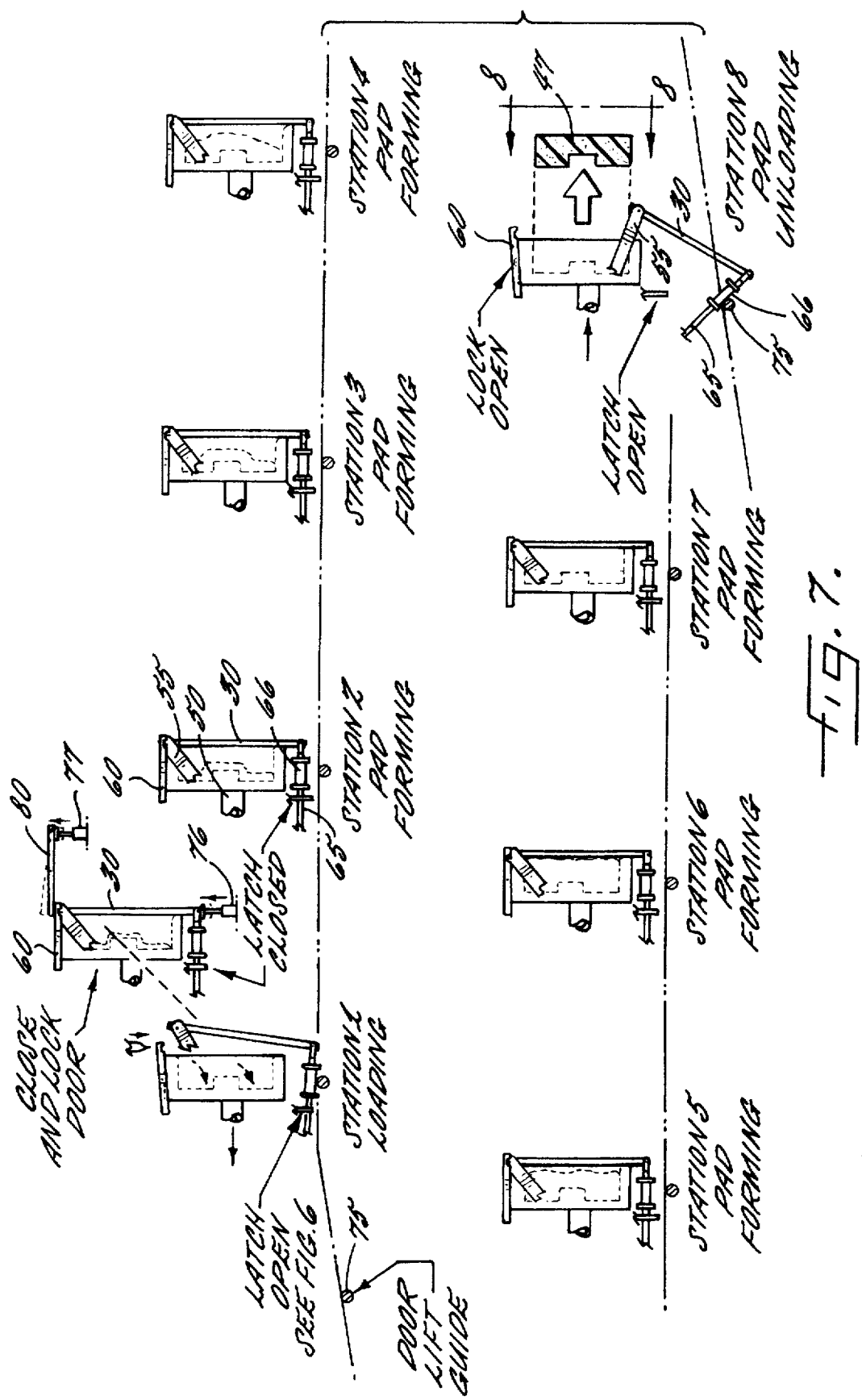
FIG. 7 illustrates the operational sequence of the molds of the present invention.

FIG. 7 illustrates the sequential operation of the door. Beginning at the upper left, FIG. 7 illustrates a door lift guide 75 which is also illustrated in FIGS. 9 through 13. As perhaps best illustrated in FIGS. 9 and 11, the door lift guide 75 is a metal bar or rod that defines a curved path around the turret 38 that begins at a low portion and rises until it is just underneath the turntable surface 41. From that position, the door lift guide 75 continues in a generally horizontal circular path around the turret 38 of the turntable 22. FIG. 10 also illustrates the relationship among the doors 30, the door lift arms 65, and the door lift guide 75.

The sequence illustrated in FIG. 7 begins with the door opened following removal of a cushion from the mold. As the rolling collar 66 of the door lift arm 65 rides the door lift guide 75, it rises and lifts the door 30 with it. When a bag has been placed in the mold, a first air cylinder 76 (typically positioned on an arm extending from the turret 38 and underneath the top surface 41) pushes the door 30 from the bottom to latch it, while a second air cylinder 77 (typically positioned on an arm adjacent the bag-making means) urges a pivoting locking bar 80 to close the pivoting top clamp 60 and hold the door 30 in place. Once the door is latched in place, the mold continues around the turntable thus providing a period of time (one or two minutes is generally sufficient) during which the foamable composition forms foam in a shape limited (and thus defined) by the shape of the mold and the door. FIG. 7 labels these steps as stations 2-7. As a mold approaches the pad unloading station 24, however, the bottom latch 70 strikes a stub 81 (FIGS. 10 and 12) which, combined with the rotation of the turntable, pivots the bottom latch 70 opposite the direction of rotation, causing the latch 70 to in turn pivot the rear locking bar 73 from the locked to its unlocked position as illustrated in FIG. 6. When unlatched, the door is free to drop, but its fall is moderated by the horizontal cam 82 on the turret of the turntable 22 that the door lift arm 65 rides and follows as it descends. The air cylinders 56 also help moderate the door's drop to its open position, which is shown at the end of FIG. 7. The last portion of FIG. 7 illustrates the door lift arm 65 in its lowest position with its rolling collar 66 resting on the lowest portion of the door lift guide 75.

As FIGS. 11 and 12 illustrate, as the turntable continues to rotate, the rolling collar 66 on the lift arm 55 follows the door lift guide 75 upwardly thus lifting the door to a raised, but still open position at which it receives the bag 34 from the bag making station 21. This position corresponds generally to that illustrated in FIG. 5.

Figure 13A:
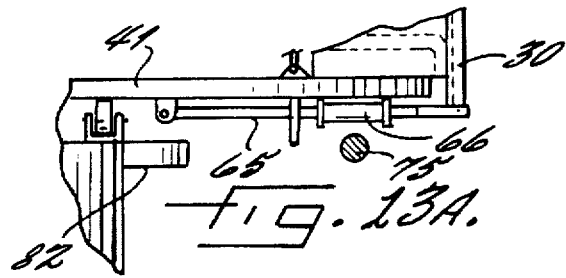
FIGS. 13A through 13H show the sequential operation of the mold doors according to the present invention.
Figure 13B:
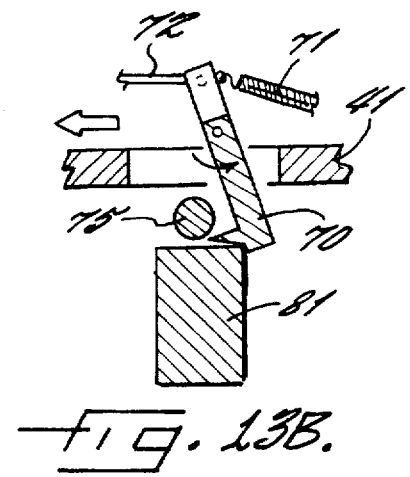
Figure 13C:
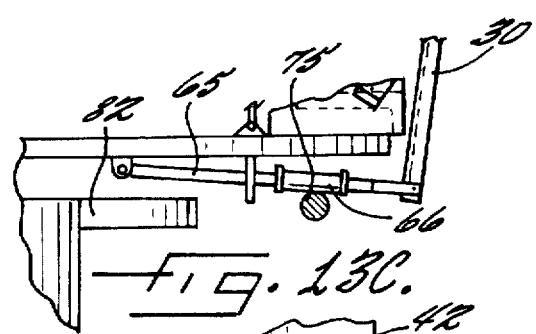
Figure 13D:
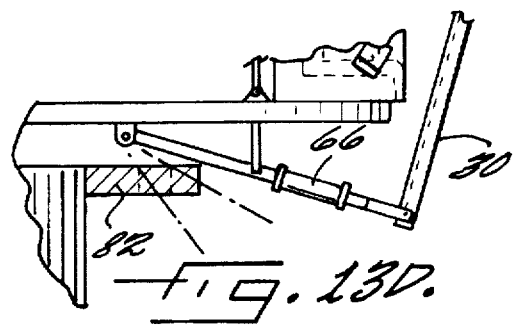
Figure 13E:
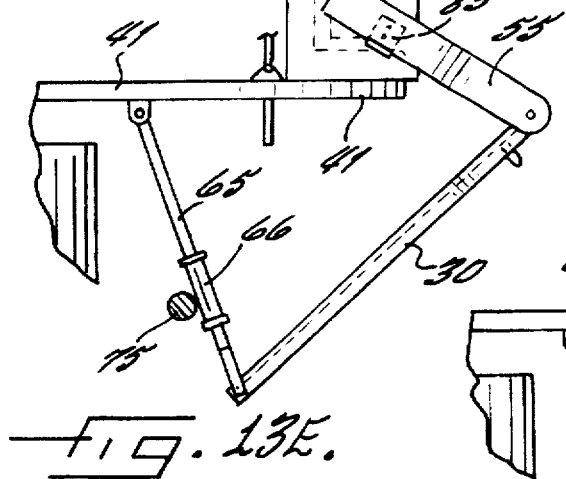
Figure 13F:
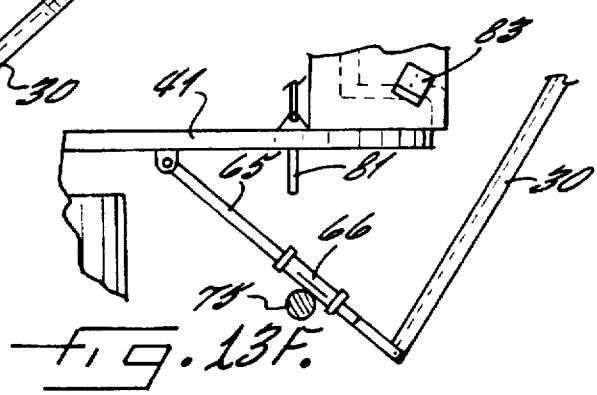
Figure 13G:
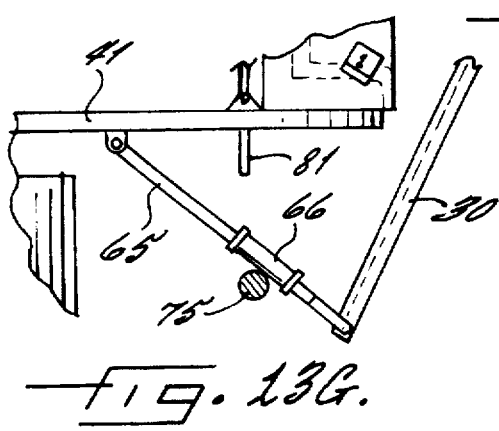
Figure 13H:
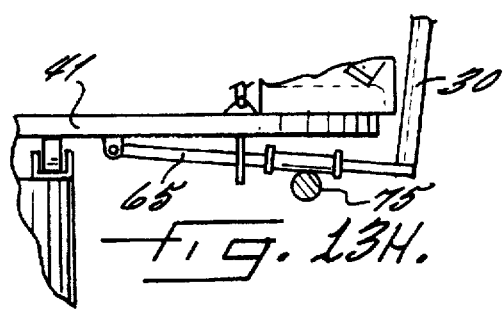

FIGS. 12 and 13 complement one another in illustrating the progression of the door from a fully locked position (FIG. 13A), to the position at which the bottom latch 70 hits the stub 81 (FIG. 13B), to the drop of the door lift arm 65 against the cam 82 (FIGS. 13C and 13D), until the door reaches its lowest point (FIG. 13E), at which point the door lift guide 75 begins to raise the door to the pad loading position (FIGS. 13F, 13G and 13H). FIG. 13 also illustrates that the lower position of the door is additionally limited by a pair of brackets 83 on the side of the mold support 42, and that are also illustrated in FIG. 4.

Thus, in another aspect, the invention comprises a method of automatically molding defined three-dimensional foam cushions. The method comprises preparing a plastic bag from a stock supply of plastic film material. As discussed earlier, the illustrated embodiment forms the bag from two separate sheets of plastic film material by sealing two longitudinal edges and two transverse edges, but the method can also comprise preparing the bag from a center folded sheet of plastic film material and sealing one longitudinal edge and two transverse edges to form the bag. Additionally, the method could also comprise preparing the bag from a tube of plastic film material and sealing the tube with two transverse seals to form the bag.

A foamable composition is then placed in the prepared plastic bag and sealed therein. FIG. 4 illustrates that (as described in the background) the foamable composition (such as a polyurethane) is typically formed from two components labelled A and B fed by respective hoses 85 and 86 to an injection nozzle 87 from which it is dispensed into the bag 34 being formed.

The method next comprises aligning the prepared bag with the three-dimensional mold prior to separating the bag from the stock supply of plastic 36. It will be understood that this aligning step is one of the features of the invention that distinguishes it from manual, because without it, the necessary replacement step is to place the bag manually in the mold, which is otherwise conventional.

The aligned bag is then separated from the stock supply of plastic film material and delivered to the three-dimensional mold in which it is maintained until the foamable composition has substantially finished forming foam.

As the drawings illustrated the step of aligning the bag with the mold typically comprises moving a mold to a position underneath the bag making means, and the step of delivering the bag to the mold comprises applying a vacuum to the mold and dropping the bag into the mold while the vacuum is being applied.

The method can further comprise the step of releasing the bag from the mold after the foamable composition has formed a foam cushion with the shape of the mold, and in the preferred embodiment, the step of releasing the bag comprises blowing air into the mold to help eject the finished foam cushion therefrom.

As noted above, the step of separating the aligned bag from the stocked supply of film material generally comprises heat sealing and severing the bag.

In the drawings and specification, there have been disclosed typically preferred embodiments of the invention and, although specific terms have been employed, they have been used in a generic sense and descriptive sense only, and not for purposes of limitation, the scope of the invention being set forth in the following claims.

That which is claimed is:

1. An apparatus for automatically molding defined three-dimensional foam cushions, and comprising:

means for preparing a bag from solidified plastic film material and for enclosing a foamable composition in the plastic bag, said bag preparing means including means for automatically withdrawing the solidified plastic film material from a stock supply, means for automatically manipulating the plastic film material to position portions thereof in parallel, adjacent relation, and means for automatically sealing the plastic film portions together at selected locations to form the plastic bag;

means for automatically moving a mold into alignment with the plastic bag and the bag preparing means concurrently with the preparation of the bag by the bag preparing means;

means for automatically placing the bag containing the foamable composition into said aligned mold as the foamable composition begins to form foam; and means for maintaining the bag in said mold until the foamable composition has substantially finished forming foam in a shape conforming to said mold.

2. A foam cushion molding apparatus according to claim 1 wherein:

said bag preparing means comprises means for separating the plastic bag from the plastic film material after the foamable composition has been placed therein; and said aligning means comprises means for aligning the bag with the mold before the bag is separated from the plastic film material.

3. A foam cushion molding apparatus according to claim 2 wherein said bag separating means comprises means for heat sealing and severing a bag from the remaining plastic film material.

4. A foam cushion molding apparatus according to claim 2 wherein said aligning means comprises a turntable for carrying said mold and for positioning said mold under said bag preparing means.

5. A foam cushion molding apparatus according to claim 4 wherein said bag placing means comprises means for applying a vacuum through said mold and to a bag to help position the bag in said mold as the foamable composition begins to form foam.

6. A foam cushion molding apparatus according to claim 5 and further comprising:

a plurality of molds; and wherein said aligning means further comprises means for sequentially presenting and aligning said molds with said bag forming means so that said molds sequentially receive plastic bags containing the foamable composition.

7. A foam cushion molding apparatus according to claim 6 wherein said sequential presenting and aligning means comprises a turntable.

8. A foam cushion molding apparatus according to claim 1 and further comprising means for releasing a finished cushion from said mold.

9. A foam cushion molding apparatus according to claim 5 or claim 8 wherein said vacuum applying means and said cushion releasing means comprises a plurality of holes in said mold that permit a vacuum or blowing air to be respectively applied therethrough.

10. A foam cushion molding apparatus according to claim 1 and further comprising means for measuring the temperature of said mold just prior to placing a bag therein.

11. A foam cushion molding apparatus according to claim 10 and further comprising means for adjusting the amount of foamable composition placed in a bag based upon the measured temperature.

12. A foam cushion molding apparatus according to claim 6 and further comprising means for preventing a second bag from being placed in a mold that already carries a bag or finished cushion.

13. A foam cushion molding apparatus according to claim 12 wherein said preventing means comprises means for determining whether a mold carries a bag or cushion.

14. A foam cushion molding apparatus according to claim 1 wherein said means for enclosing a foamable composition in the bag comprises means for injecting foamable composition between two plastic sheets while said bag preparing means makes a bag.

15. A foam cushion molding apparatus according to claim 1 wherein said means for maintaining the bag in said mold comprises a door that opens to receive a bag, closes to maintain the bag in said mold, and reopens to permit said bag to be removed from said mold.

16. An apparatus for automatically molding defined three-dimensional foam cushions, and comprising:

means for preparing a plastic bag filled with a foamable composition from a stock supply of solidified plastic film material and foam precursors, said bag preparing means including means for automatically withdrawing the solidified plastic film material from the stock supply, means for automatically manipulating the plastic film material to position portions thereof in parallel, adjacent relation, and means for automatically sealing the plastic film portions together at selected locations to form the plastic bag;

a rotating turntable that carries a plurality of molds for sequentially aligning each of said molds with said bag-preparing means; and means for releasing a bag from said bag-making means and delivering a bag to a mold after said turntable has sequentially aligned a mold with said bag making means.

17. A foam cushion molding apparatus according to claim 16 wherein:

said bag preparing means comprises means for separating the plastic bag from the stock supply of plastic film material after the foamable composition has been placed therein; and said turntable aligns the bag with a mold before the bag is separated from the plastic film material.

18. A foam cushion molding apparatus according to claim 17 wherein said bag separating means comprises means for heat sealing and severing a bag from the remaining plastic film material.

19. A foam cushion molding apparatus according to claim 16 wherein:

each said mold comprises a plurality of small holes; and said turntable comprises means for applying a vacuum through said holes in said mold and to a bag to help position the bag in said mold as the foamable composition begins to form foam.

20. A foam cushion molding apparatus according to claim 16 and further comprising means for measuring the temperature of said mold just prior to placing a bag therein.

21. A foam cushion molding apparatus according to claim 20 and further comprising means for adjusting the amount of foamable composition placed in a bag based upon the measured temperature.

22. A foam cushion molding apparatus according to claim 16 and further comprising means for preventing a second bag from being placed in a mold that already carries a bag or finished cushion.

23. A foam cushion molding apparatus according to claim 22 wherein said preventing means comprises means for determining whether a mold carries a bag or cushion.

24. A foam cushion molding apparatus according to claim 16 wherein said bag preparing and filling means comprises means for injecting the foamable composition between two plastic sheets while said bag preparing means makes a bag.

25. A foam cushion molding apparatus according to claim 16 wherein:

said molds have holes extending therethrough; and wherein said turntable further comprises, means for applying a vacuum through said holes, and means for blowing release air through said holes.

26. A foam cushion molding apparatus according to claim 16 wherein:

said molds comprise doors; and said turntable comprises means for opening said door to permit a bag to be positioned in said mold, means for closing said door to maintain a bag in said mold while the foamable composition forms foam into a molded bag, and means for reopening said door to remove a molded foam cushion from said mold after the foamable composition has substantially finished forming foam.

* * * * *